United States Patent
Banerjee et al.

(10) Patent No.: US 11,411,968 B1
(45) Date of Patent: Aug. 9, 2022

(54) SYSTEMS AND METHODS FOR PROTECTING A CLOUD COMPUTING DEVICE FROM MALWARE

(71) Applicant: CA, INC., San Jose, CA (US)

(72) Inventors: Ashok Banerjee, Redwood City, CA (US); Susan Hassall, Brookeville, MD (US)

(73) Assignee: CA, INC., New York, NY (US)

( * ) Notice: Subject to any disclaimer, the term of this patent is extended or adjusted under 35 U.S.C. 154(b) by 359 days.

(21) Appl. No.: 16/574,755

(22) Filed: Sep. 18, 2019

(51) Int. Cl.
*H04L 29/06* (2006.01)
*H04L 9/40* (2022.01)
*G06F 21/62* (2013.01)

(52) U.S. Cl.
CPC ...... *H04L 63/1416* (2013.01); *G06F 21/6245* (2013.01); *H04L 63/083* (2013.01); *H04L 63/0853* (2013.01); *H04L 63/0861* (2013.01); *H04L 63/10* (2013.01); *H04L 63/145* (2013.01); *H04L 63/20* (2013.01); *H04L 2463/082* (2013.01)

(58) Field of Classification Search
CPC .............. H04L 63/1416; H04L 63/083; H04L 63/0853; H04L 63/0861; H04L 63/10; H04L 63/145; H04L 63/20; H04L 2463/082; G06F 21/6245
USPC .......................................................... 726/23
See application file for complete search history.

(56) References Cited

U.S. PATENT DOCUMENTS

2016/0330172 A1* 11/2016 Muttik ................. H04L 63/101
2018/0109504 A1* 4/2018 Poffenbarger ........ H04L 9/0637

* cited by examiner

*Primary Examiner* — Jeffrey C Pwu
*Assistant Examiner* — Nega Woldemariam
(74) *Attorney, Agent, or Firm* — Foley & Lardner LLP

(57) ABSTRACT

The disclosed computer-implemented method for protecting a cloud computing device from malware may include (i) intercepting, at a computing device, a malicious attempt by the malware to (A) access sensitive information in an encrypted file stored on the computing device and (B) send the sensitive information to the cloud computing device and (ii) performing, responsive to the attempt to access the encrypted file, a security action. Various other methods, systems, and computer-readable media are also disclosed.

20 Claims, 6 Drawing Sheets

SYSTEMS AND METHODS FOR PROTECTING A CLOUD COMPUTING DEVICE FROM MALWARE

BACKGROUND

Information is increasingly stored and processed in the cloud instead of being stored and processed by end-point computing devices. For example, information is increasingly being stored and processed by services such as infrastructure-as-a-service (IaaS), software-as-a-service (SaaS), and shared storage. As a result, attacks on cloud computing devices are on an increase. One of the attack vectors for attacks on cloud accounts and content is via end-point computing devices. The present disclosure, therefore, identifies and addresses a need for systems and methods for protecting a cloud computing device from malware.

SUMMARY

As will be described in greater detail below, the present disclosure describes various systems and methods for protecting cloud computing devices from malware. In some examples, the present disclosure describes various systems and methods for protecting cloud accounts (e.g., accounts on cloud computing devices) and/or cloud-based content (e.g., content stored on and/or processed by cloud computing devices) from malware acting at end-point computing devices.

In one example, a method for protecting a cloud computing device from malware may include (i) intercepting, at a computing device and using a file filter driver, a malicious attempt by the malware to (A) access sensitive information in an encrypted file stored on the computing device and (B) send the sensitive information to the cloud computing device and (ii) performing, at the computing device and responsive to the attempt to access the encrypted file, a first security action including (A) performing multifactor authentication responsive to the attempt to access the encrypted file, (B) performing file integrity monitoring on the encrypted file to identify a change to credentials required to access the encrypted file, (C) maintaining the encrypted file as encrypted in response to less than two authentication factors being validated, (D) determining a time at which the attempt to access the encrypted file occurs, (E) performing user and entity behavior analytics to identify an abnormal file access pattern, and (F) performing a second security action when at least one of (I) the multifactor authentication fails, (II) the file integrity monitoring identifies an unauthorized change to the credentials required to access the encrypted file, (Ill) the attempt to access the encrypted file occurs outside of a predetermined schedule, or (IV) user and entity behavior analytics identifies the abnormal file access pattern.

In some examples, the sensitive information may include a login credential. In some embodiments, the login credential may include at least one of a secure shell key, a password, and a token. In an example, the sensitive information may include a privacy-enhanced mail file. In an embodiment, the sensitive information may include a financial account number. In some examples, the financial account number may include at least one of a credit card number and a bank account number.

In some embodiments, the method may include logging the attempt to access the encrypted file.

In an example, the performing multifactor authentication may include authenticating at least two of: a password, a personal identification number, a smart card, a token, biometric information, and challenge response information.

In an embodiment, the method may include saving the encrypted file on a storage device of the computing device when the file integrity monitoring indicates the encrypted file is changed relative to a prior version of the encrypted file.

In some examples, the second security action may include at least one of (i) further encrypting the encrypted file, (ii) denying access to the encrypted file, (iii) blocking access to the encrypted file, and (iv) conditionally allowing access to the encrypted file.

In some embodiments, conditionally allowing access to the encrypted file may include at least one of (i) allowing access to the encrypted file based on a respective download rate, (ii) allowing access to the encrypted file based on compliance of the computing device with a policy, (iii) allowing access to the encrypted file based on a global threat landscape, and (iv) allowing access to the encrypted file based on a local threat landscape.

In an example, the second security action may include displaying, on a user display, an indication of an act performed as a part of the second security action.

In one embodiment, a system for protecting a cloud computing device from malware may include at least one physical processor and physical memory that includes computer-executable instructions that, when executed by the physical processor, cause the physical processor to (i) intercept, at the system and using a file filter driver, a malicious attempt by the malware to (A) access sensitive information in an encrypted file stored on the system and (B) send the sensitive information to the cloud computing device and (ii) perform, at the system and responsive to the attempt to access the encrypted file, a first security action including (A) performing multifactor authentication responsive to the attempt to access the encrypted file, (B) performing file integrity monitoring on the encrypted file to identify a change to credentials required to access the encrypted file, (C) maintaining the encrypted file as encrypted in response to less than two authentication factors being validated, (D) determining a time at which the attempt to access the encrypted file occurs, (E) performing user and entity behavior analytics to identify an abnormal file access pattern, and (F) performing a second security action when at least one of (I) the multifactor authentication fails, (II) the file integrity monitoring identifies an unauthorized change to the credentials required to access the encrypted file, (III) the attempt to access the encrypted file occurs outside of a predetermined schedule, or (IV) user and entity behavior analytics identifies the abnormal file access pattern.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) intercept, at the computing device and using a file filter driver, a malicious attempt by the malware to (A) access sensitive information in an encrypted file stored on the computing device and (B) send the sensitive information to the cloud computing device and (ii) perform, at the computing device and responsive to the attempt to access the encrypted file, a first security action including (A) performing multifactor authentication responsive to the attempt to access the encrypted file, (B) performing file integrity monitoring on the encrypted file to identify a change to credentials required to access the encrypted file, (C) maintaining the encrypted file as encrypted in response to less than two authentication factors being validated, (D) determining a time at which the attempt to access the encrypted file occurs, (E) performing user and entity behavior analytics to identify an abnormal file access pattern, and (F) performing a second security action when at least one of (I) the multifactor authentication fails, (II) the file integrity monitoring identifies an unauthorized change to the credentials required to access the encrypted file, (III) the attempt to access the encrypted file occurs outside of a predetermined schedule, or (IV) user and entity behavior analytics identifies the abnormal file access pattern.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
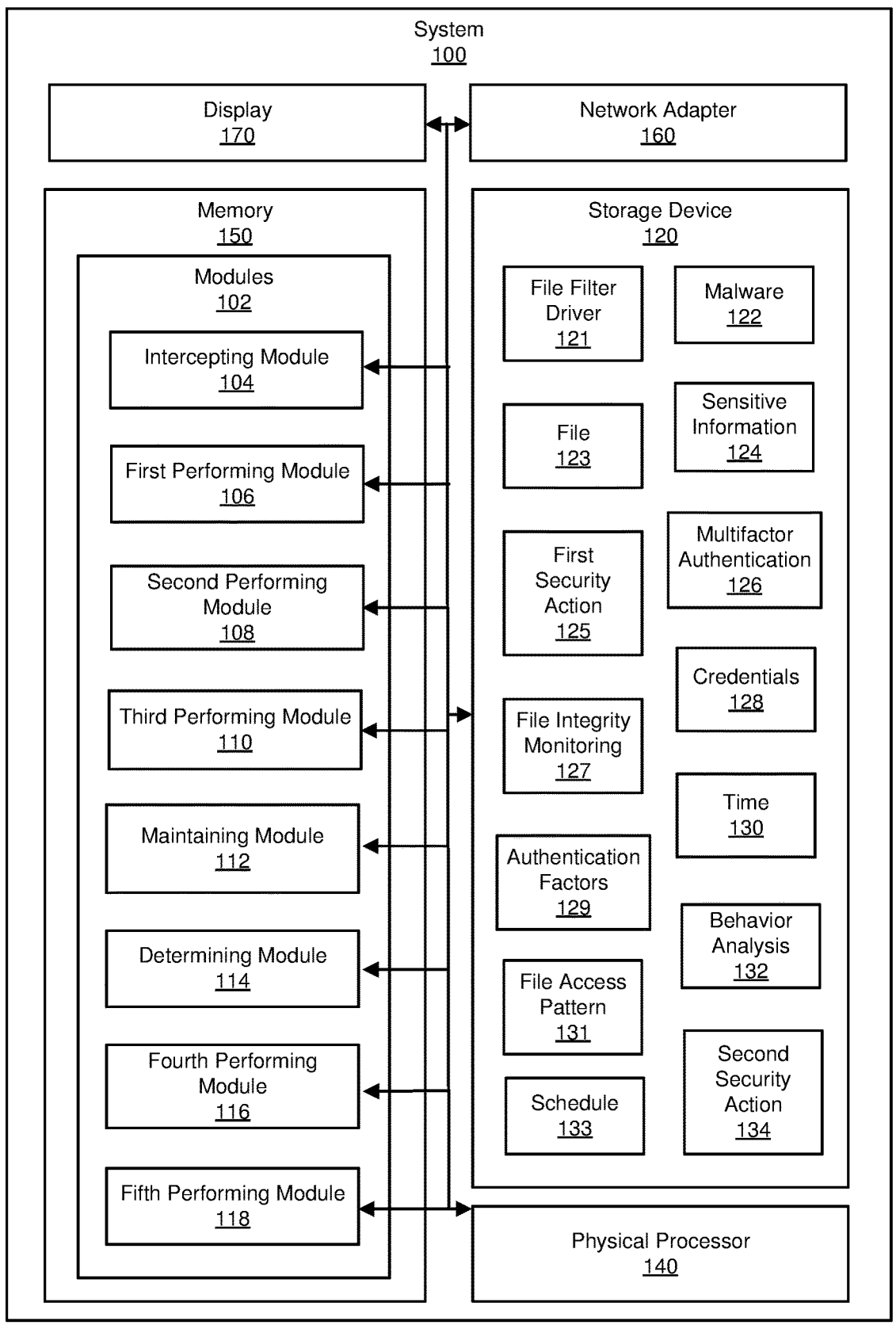
FIG. 1 is a block diagram of an example system for protecting a cloud computing device from malware.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting a cloud computing device from malware.

In recent times, laptop and desktop computing devices are increasingly becoming portals to access information stored remotely in a server, to process information remotely by a server, or both. In examples, provided are systems and methods for protecting servers from infection via compromised computing devices. In examples, the servers being protected may be cloud computing devices such as infrastructure-as-a-service (IaaS) servers, software-as-a-service (SaaS) servers, application servers, web servers, storage servers (e.g., shared storage servers), and/or database servers configured to run certain software applications and/or provide various security, web, storage, and/or database services. In some examples, compromised computing devices may include end-point computing devices, portal devices, etc.

Malware protection systems that protect servers may not be enabled to protect the compromised computing devices. However, the compromised computing devices may store sensitive information such as login credentials, thus enabling both authorized users and malware to maliciously access the servers, upload infected files to the servers, and/or maliciously use the servers via the compromised computing devices. Login credentials (e.g., such as those of software developers) may include secure hash keys, private keys, public keys, tokens, and/or other login credentials.

Thus, in examples, provided are systems and methods for protecting cloud computing devices from compromised endpoint computing devices. In an example, file filter drivers inspect less than all calls to access files on disks of the compromised computing devices to determine if the files include sensitive information. In some embodiments, the file filter drivers may inspect every call to access files on the disks of the compromised computing devices to determine if the files include sensitive information. In a non-limiting example, about 1% of the files include sensitive information, while the other 99% of the files do not include sensitive information. In some embodiments, the provided techniques do not perform any other operations on the files that do not include sensitive information. In some non-limiting embodiments, in response to attempts to access the files that include sensitive information, the provided techniques may perform operations such as (i) performing user validation, (ii) performing file integrity monitoring, (iii) performing multifactor authentication, (iv) keeping the files encrypted until at least two authentication factors are authenticated, (v) limiting file access to certain predetermined times of day, (vi) performing user behavioral analysis, and/or (vii) performing entity behavioral analysis.

By doing so, the systems and methods described herein may advantageously improve the security of computing devices and/or provide targeted protection against malware and/or malicious users. As such, the provided techniques may protect users by beneficially reducing security risks posed by malicious processes and/or malicious users. In some embodiments, the provided techniques may advantageously protect cloud computing devices from malware operating on compromised computing devices. In some embodiments, the provided techniques may advantageously protect cloud computing devices from malware attempting to infect cloud computing devices. In an example, the provided techniques may be compatible with and may compliment anti-malware, intrusion prevention, and firewall systems protecting end-point computing devices. In an example, the provided techniques may require little, if any, user interaction.

Figure 2:
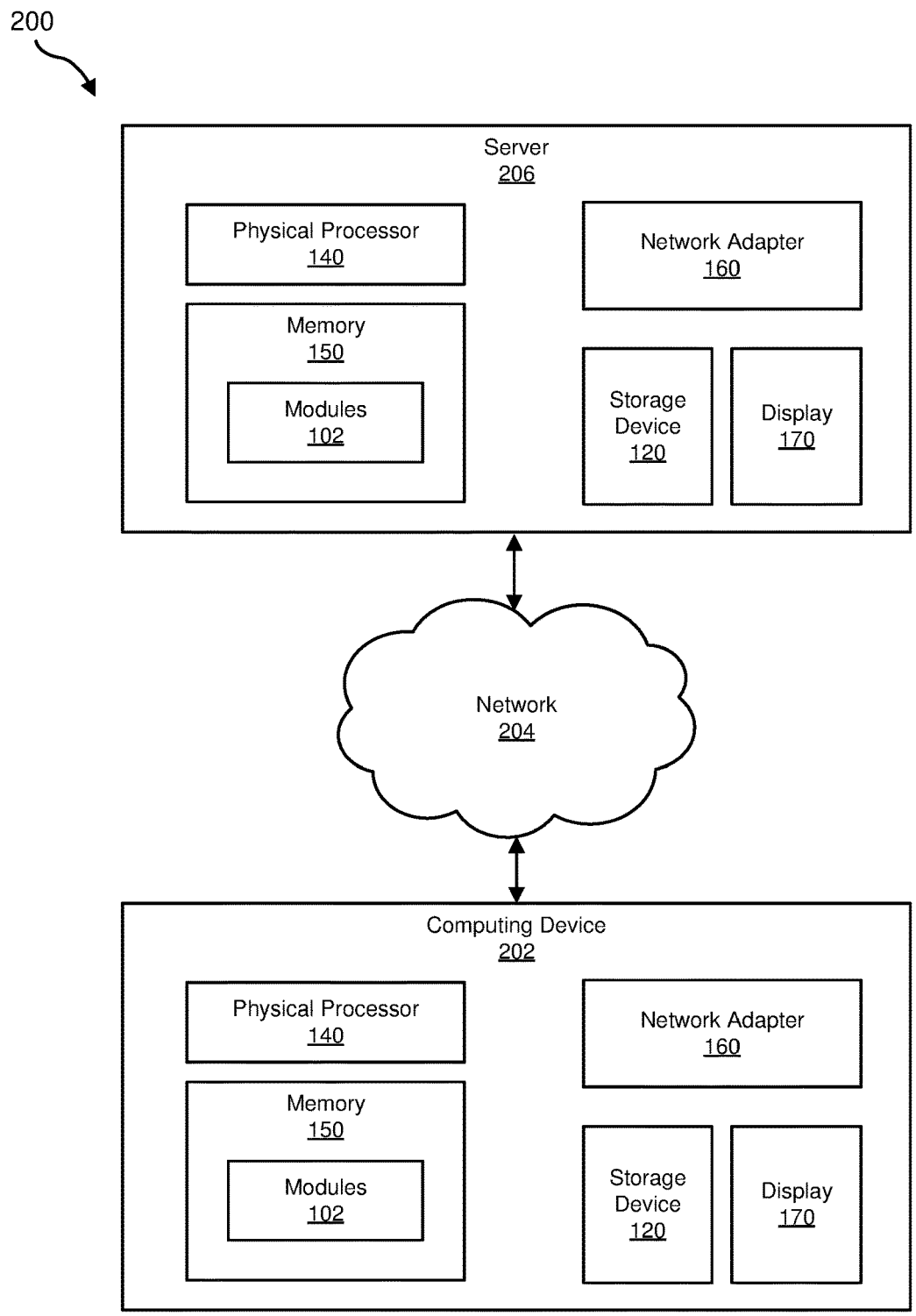
FIG. 2 is a block diagram of an additional example system for protecting a cloud computing device from malware.
Figure 3:
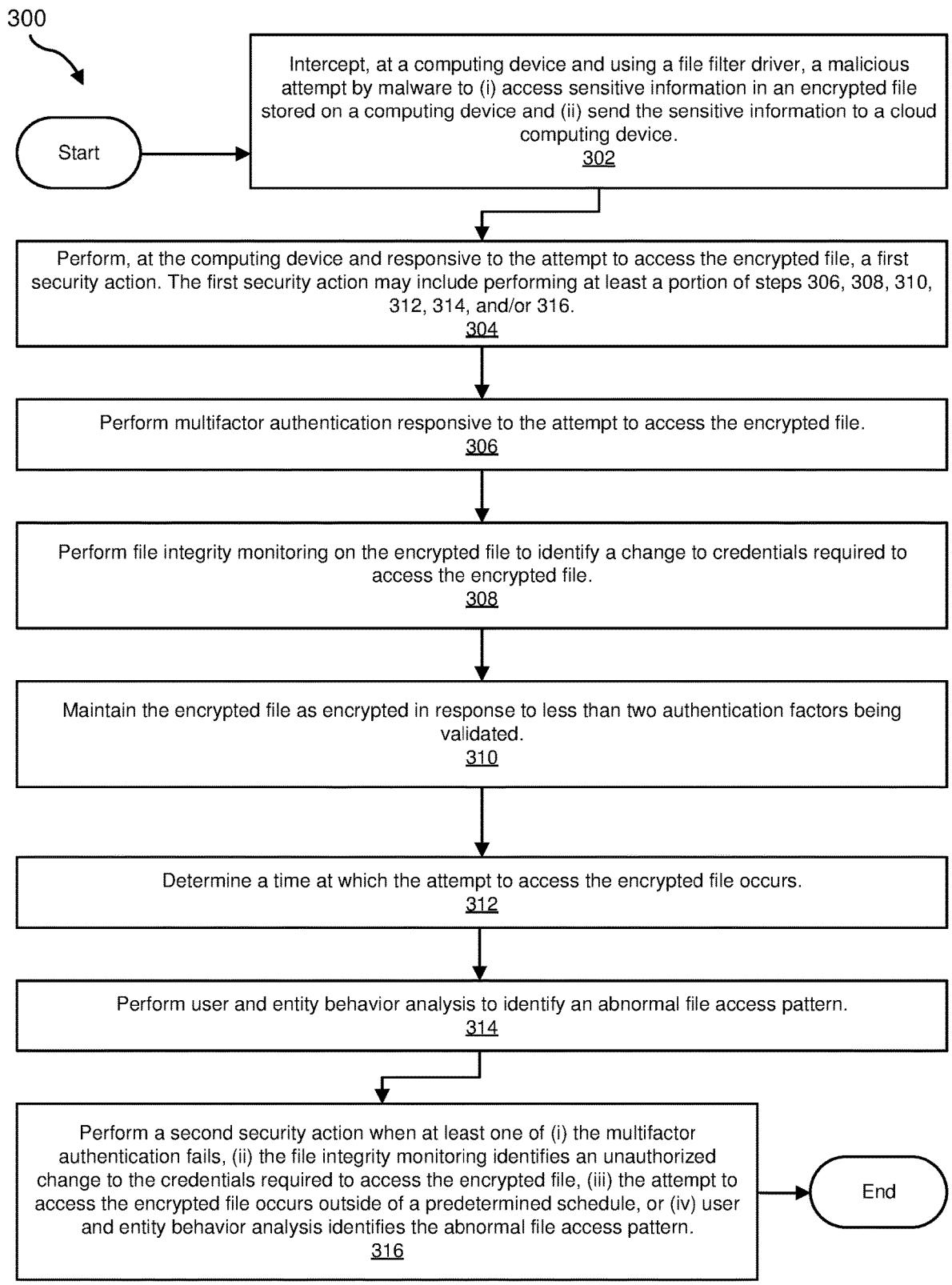
FIG. 3 is a flow diagram of an example method for protecting a cloud computing device from malware.
Figure 4:
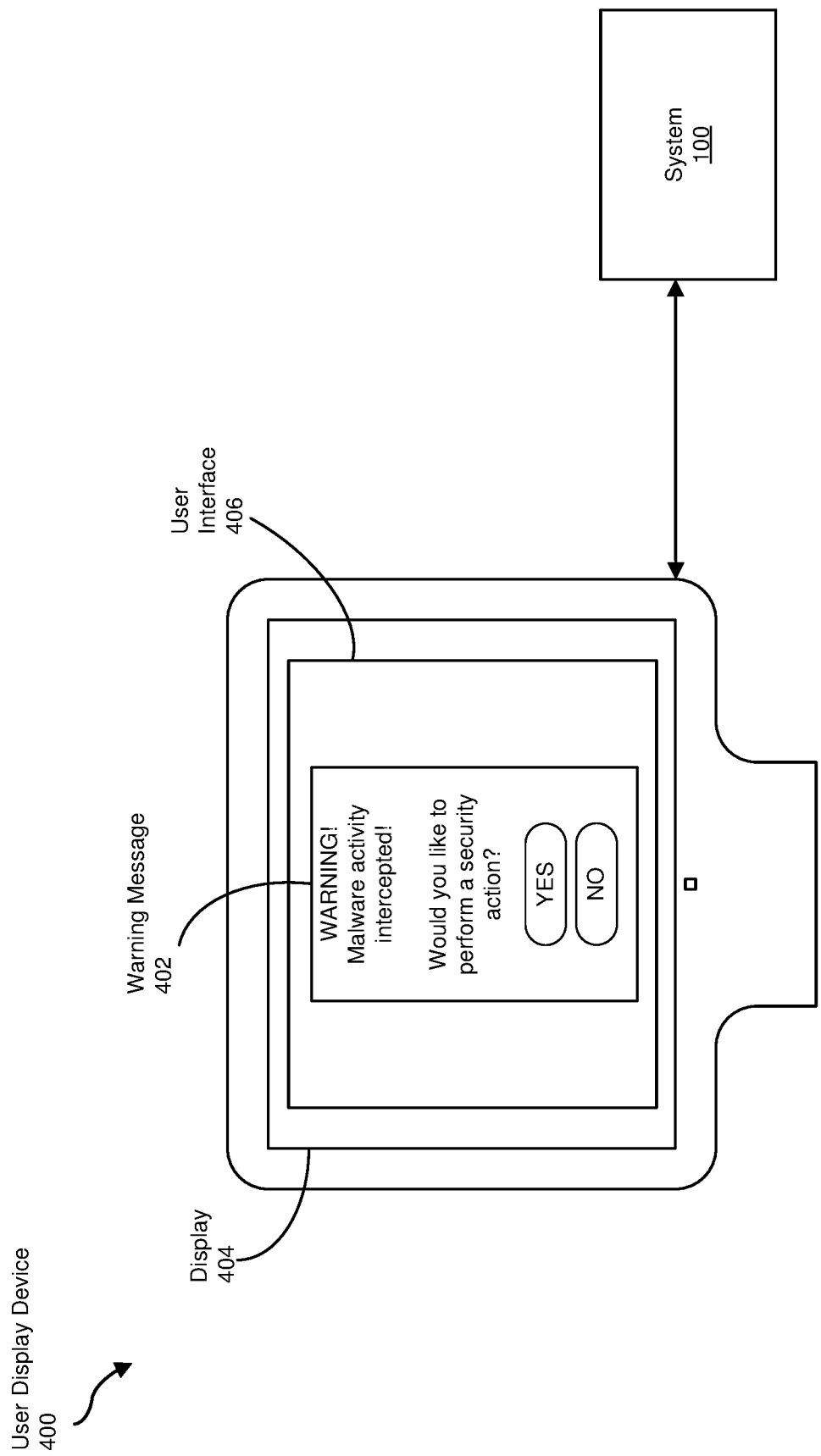
FIG. 4 is a block diagram of an example warning message on a user display device.

The following will provide, with reference to FIGS. 1-2 and 4, detailed descriptions of example systems for protecting a cloud computing device from malware. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for protecting a cloud computing device from malware. As illustrated in this figure, example system 100 may include one or more modules 102 for performing one or more tasks. As will be explained in greater detail below, modules 102 may include an intercepting module 104, a first performing module 106, a second performing module 108, a third performing module 110, a maintaining module 112, a determining module 114, as fourth performing module 116, and/or a fifth performing module 118. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of a filter line driver 121, malware 122, a file 123 (e.g., at least a partially encrypted file, at least a partially unencrypted file), sensitive information 124, a first security action 125, multifactor authentication 126, file integrity monitoring 127, credentials 128, authentication factors 129, a time 130, a file access pattern 131, behavior analytics 132, a schedule 133, and/or a second security action 134. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 140. Physical processor 140 generally represents any type or form of hardware-implemented processing unit capable of interpreting and/or executing computer-readable instructions. In one example, physical processor 140 may access and/or modify one or more of modules 102 stored in memory 150. Additionally or alternatively, physical processor 140 may execute one or more of modules 102 to facilitate protecting a cloud computing device from malware. Examples of physical processor 140 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 150. Memory 150 generally represents any type or form of volatile or non-volatile storage device or medium capable of storing data and/or computer-readable instructions. In one example, memory 150 may store, load, and/or maintain one or more of modules 102. Examples of memory 150 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more network adapters, such as network adapter 160. In some examples, network adapter 160 may be a physical network adapter connected to a physical network (e.g., network 204 in FIG. 2).

As illustrated in FIG. 1, example system 100 may also include one or more display devices, such as display 170. Display 170 generally represents any type or form of device capable of visually displaying information (e.g., to a user). In some examples, display 170 may present a graphical user interface. In non-limiting examples, display 170 may present at least a portion of information indicating one or more of filter line driver 121, malware 122, file 123, sensitive information 124, first security action 125, multifactor authentication 126, file integrity monitoring 127, credentials 128, authentication factors 129, time 130, file access pattern 131, behavior analytics 132, schedule 133, and/or second security action 134.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to protect a cloud computing device from malware. For example, and as will be described in greater detail below, one or more of modules 102 may cause computing device 202 and/or server 206 to (i) intercept, at computing device 100 and using file filter driver 121, a malicious attempt by malware 122 to (A) access sensitive information 124 in encrypted file 123 stored on computing device 100 and (B) send sensitive information in 124 to server 206 (e.g., a cloud computing device) and (ii) perform, at computing device 100 and responsive to the attempt to access encrypted file 123, first security action 125 including (A) performing multifactor authentication 126 responsive to the attempt to access encrypted file 123, (B) performing file integrity monitoring 127 on encrypted file 123 to identify a change to credentials 128 required to access encrypted file 123, (C) maintaining encrypted file 123 as encrypted in response to less than two authentication factors 129 being validated, (D) determining time 130 at which the attempt to access encrypted file 123 occurs, (E) performing user and entity behavior analytics 132 to identify an abnormal file access pattern 131, and (F) performing second security action 134 when at least one of (I) multifactor authentication 126 fails, (II) file integrity monitoring 127 identifies an unauthorized change to credentials 128 required to access encrypted file 123, (III) the attempt to access encrypted file 123 occurs outside of a predetermined schedule 133, or (IV) user and entity behavior analytics 132 identifies the abnormal file access pattern 131.

Computing device 202 generally represents any type or form of computing device capable of reading computer-executable instructions. In some examples, computing device 202 may represent a computer running security software, such as anti-malware software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device capable of reading computer-executable instructions. In some examples, server 206 may represent a computer running security software, such as anti-malware software. In some embodiments, server 206 may represent a cloud computing device. Additional examples of server 206 include, without limitation, infrastructure-as-a-service (IaaS) servers, software-as-a-service (SaaS) servers, security servers, application servers, web servers, storage servers (e.g., shared storage servers), and/or database servers configured to run certain software applications and/or provide various security, web, storage, and/or database services. Although illustrated as a single entity in FIG. 2, server 206 may include and/or represent a plurality of servers that work and/or operate in conjunction with one another.

FIG. 3 is a flow diagram of an example computer-implemented method 300 for protecting a cloud computing device from malware. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may intercept (e.g., at computing devices and/or using file filter drivers (FFDs)) malicious attempts by malware. In some examples, the malicious attempts may include attempts to access sensitive information stored in encrypted files that are stored on the computing devices. The encrypted files may include sensitive information. In some embodiments, the malicious attempts to access the sensitive information may include malicious attempts to access the encrypted files. In some examples, the malicious attempts may include attempts to send encrypted files to cloud computing devices. In some examples, the malicious attempts may include attempts to send the sensitive information (e.g., login credentials) to cloud computing devices (e.g., to access the cloud computing devices). The systems described herein may perform step 302 in a variety of ways. For example, intercepting module 104 may, as part of computing device 202 in FIG. 2, intercept, at computing device 100 and using file filter driver 121, a malicious attempt by malware 122 to (A) access sensitive information 124 stored in encrypted file 123 that is stored on computing device 100 and (B) send sensitive information 124 to server 206 (e.g., a cloud computing device).

In some examples, files (e.g., file 123) may be infected with the malware. In some examples, computing device 100 may be infected with the malware.

The term "sensitive information," as used herein, generally refers to valuable information, the uncontrolled dissemination of which may cause harm and/or losses to people, governments, and/or businesses. Examples of sensitive information include, without limitation, personally identifiable information (PII). In some embodiments, sensitive information may include identification (ID) numbers, social security numbers, account numbers in conjunction with names, emails, addresses, phone numbers, financial information, health care information, business strategies, classified government information, law enforcement information, the like, or combinations thereof. In an embodiment, the sensitive information may include financial account numbers. In some examples, the financial account numbers may include at least one of credit card numbers and/or bank account numbers. In some examples, sensitive information may include login credentials. In some embodiments, the login credentials may include at least one of secure shell (ssh) keys, passwords, and/or tokens. In an example, the sensitive information may include privacy-enhanced mail files.

In some embodiments, the method may include logging the attempts to access the encrypted files. Logging may enable subsequent forensic analysis of the malware and/or activities of the malware.

As illustrated in FIG. 3, at step 304 one or more of the systems described herein may perform (e.g., at the computing device), responsive to the attempts to access the encrypted files, first security actions. In some embodiments, the first security actions may include performing at least a portion of steps 306, 308, 310, 312, 314, and/or 316. The systems described herein may perform step 304 in a variety of ways. For example, first performing module 106 may, as part of computing device 202 in FIG. 2, perform first security action 125 at computing device 100 and responsive to the attempt to access encrypted file 123. In some embodiments, first security action 125 may include performing at least a portion of steps 306, 308, 310, 312, 314, and/or 316.

As illustrated in FIG. 3, at step 306 one or more of the systems described herein may perform multifactor authentication (MFA) responsive to the attempts to access the encrypted files. The systems described herein may perform step 306 in a variety of ways. For example, second performing module 108 may, as part of computing device 202 in FIG. 2, perform multifactor authentication 126 responsive to the attempt to access encrypted file 123.

In some examples, when MFA successfully authenticates responsive to the attempt to access the encrypted files, then the encrypted files may be decrypted. In some embodiments, when MFA successfully authenticates responsive to the attempt to access the encrypted files, then the sensitive information in the encrypted files may be sent to the cloud computing devices. In some embodiments, when MFA successfully authenticates responsive to the attempt to access the encrypted files, then the sensitive information in the encrypted files may be sent to requesting processes implemented on the cloud computing devices.

In some circumstances, an attacker such as malware may know a single login authentication factor. Implementing multifactor authentication may confirm a presence of the malware by forcing authentication of additional factors prior to enabling access to the servers, sending the files to the servers, and/or sending the sensitive information to the servers.

In some examples, performing multifactor authentication may include authenticating at least two factors that are user-specific such as passwords, personal identification numbers, smart cards, tokens, biometric information, and/or challenge response information.

As illustrated in FIG. 3, at step 308 one or more of the systems described herein may perform file integrity monitoring (FIM) on the encrypted files to identify changes to credentials required to access the encrypted files. The systems described herein may perform step 308 in a variety of ways. For example, third performing module 110 may, as part of computing device 202 in FIG. 2, perform file integrity monitoring 127 on encrypted file 123 to identify a change to credentials 128 required to access encrypted file 123.

In some embodiments, attackers such as malware may attempt to change login credentials from credentials of an authorized user to credentials of the attackers, in order to enable the attackers to easily access the servers and/or send files to the servers. In some example, firewalls may not block the files because the compromised computing device is sending the files and/or the sensitive information to the servers using valid credentials. The servers may be compromised and/or under control by the attackers.

File integrity monitoring may identify and block unauthorized changes to credentials to thwart changes to the credentials by the attackers. In some example, changes may be authorized only after at least two authentication factors are authenticated. File integrity monitoring may also thwart ransomware by blocking updates to the credentials because ransomware needs to change the credentials to encrypt the files.

In some embodiments, the method may include saving the encrypted files on storage devices of the computing devices when the file integrity monitoring indicates the encrypted files are changed relative to prior versions of the encrypted files. In some embodiments, the method may include saving the encrypted files on storage devices of the computing devices when the file integrity monitoring indicates credentials of encrypted files are changed relative to prior versions of the credentials of the encrypted files.

As illustrated in FIG. 3, at step 310 one or more of the systems described herein may maintain the encrypted files as encrypted in response to less than two authentication factors being validated. The systems described herein may perform step 310 in a variety of ways. For example, maintaining module 112 may, as part of computing device 202 in FIG. 2, maintain encrypted file 123 as encrypted in response to less than two authentication factors 129 being validated.

In some examples, the encrypted files are maintained as encrypted and unchanged so that even if a storage device may be removed from a compromised computing device and installed on a different computing device, then the attackers cannot access the files. In an example, the files may be decrypted only after proper authentication of at least two authentication factors.

As illustrated in FIG. 3, at step 312 one or more of the systems described herein may determine times at which the attempts to access the encrypted files occur. The systems described herein may perform step 312 in a variety of ways. For example, determining module 114 may, as part of computing device 202 in FIG. 2, determine time 130 at which the attempt to access encrypted file 123 occurs.

In some examples, limiting changes to the files to certain times (i.e., access windows), limiting accessing the files to certain times, limiting sending the files to the servers to certain times, and/or limiting sending the sensitive information to the servers to certain times may reduce opportunities for attackers and/or interfere with timing of plans by the attackers.

As illustrated in FIG. 3, at step 314 one or more of the systems described herein may perform user and/or entity behavior analytics (UEBA) to identify abnormal file access patterns. The systems described herein may perform step 314 in a variety of ways. For example, fourth performing module 116 may, as part of computing device 202 in FIG. 2, perform user and entity behavior analytics 132 to identify an abnormal file access pattern 131.

In some examples, performing user and/or entity behavior analytics may confirm authenticity of parties attempting to access the files, send the files to the servers, and/or send sensitive information stored in the files to the servers. During typical usage of the compromised computing devices, user and/or entity behavior analytics monitors activity on the compromised computing devices by authenticated users and/or malware to identify and/or analyze baseline typical use and record results of the typical use (e.g., in a histogram, in a spreadsheet, etc.). In an example, flattening of the histograms indicates anomalous access patterns, which indicates access of the compromised computing devices may be suspicious and/or malicious. Accordingly, a presence of anomalous access patterns may trigger blocking access to the servers and/or sending files to the servers.

As illustrated in FIG. 3, at step 316 one or more of the systems described herein may perform second security actions when at least one of (i) the multifactor authentication fails, (ii) the file integrity monitoring identifies unauthorized changes to the credentials required to access the encrypted files, (iii) the attempts to access the encrypted files occur outside of predetermined schedules, and/or (iv) user and entity behavior analytics identifies the abnormal file access patterns. The systems described herein may perform step 316 in a variety of ways. For example, fifth performing module 118 may, as part of computing device 202 in FIG. 2, perform second security action 134 when at least one of (i) multifactor authentication 126 fails, (ii) file integrity monitoring 127 identifies an unauthorized change to credentials 128 required to access encrypted file 123, (iii) the attempt to access encrypted file 123 occurs outside of a predetermined schedule 133, or (iv) user and entity behavior analytics 132 identifies the abnormal file access pattern 131.

In some examples, the second security action may include at least one of (i) further encrypting the encrypted files, (ii) denying access to the encrypted files, (iii) blocking access to the encrypted files, and/or (iv) conditionally allowing access to the encrypted files. In some embodiments, conditionally allowing access to the encrypted files may include at least one of (i) allowing access to the encrypted files based on respective download rates, (ii) allowing access to the encrypted files based on compliance of the computing device with policies, (iii) allowing access to the encrypted files based on a global threat landscape, and/or (iv) allowing access to the encrypted files based on local threat landscapes.

In some examples, security actions may include displaying, on user displays, warnings indicating malicious attempts by malware. In an example, the second security action may include displaying, on a user display, an indication of an act performed as a part of the second security action. FIG. 4 depicts an example of a user display device 400 including display 404 which may present user interface 406. In this non-limiting example, user display device 400 may display warning message 402 as at least a part of a security action (e.g., first security action 125, second security action 134, etc.) in response to intercepting malicious attempts by malware. We now return to FIG. 3.

In some examples, method 300 may further include performing at least one security action (e.g., the first security action and/or the second security action) in response to intercepting malicious attempts by malware, detecting vulnerabilities of electronic computing devices, detecting potential security risks directed toward the electronic computing devices, detecting malicious activity directed toward the electronic computing devices, or a combination thereof.

In some examples, security actions may be performed in an attempt to ameliorate potential security risks. For example, performing modules may identify potential security risks and in response performing modules may perform security actions in attempts to ameliorate the potential security risks. In examples, security actions may include prophylactic measures taken to safeguard electronic information. Prophylactic measures may include acts undertaken to prevent, detect, and/or mitigate vulnerabilities of electronic computing devices, to implement computer security policies (e.g., detecting privacy leakage), to detect malicious activities on electronic computing devices, and/or to thwart malicious activities on electronic computing devices.

Security actions may include pausing and/or stopping acts by users and/or autonomous processes executing on computers. Security actions may also include notifying users of potential security risks (e.g., via graphical user interfaces depicted on displays). In some examples, security actions may include preventing data entry into user interfaces and/or displaying warnings on user displays. In additional examples, the security actions may include displaying, on user displays, warnings indicating that user approval is required to upload sensitive information to a computing device via a network.

Example security actions may include blocking access to devices (e.g., storage devices, memories, network devices, cloud computing devices, etc.), allowing limited access to devices, allowing read-only access to devices, encrypting information, and/or other acts limiting access to devices. In some examples, security actions may be performed automatically. In some embodiments, security actions may be performed based on a level of sensitivity of information that executing processes may attempt to transfer.

As detailed herein, the steps outlined in method 300 in FIG. 3 may advantageously improve the security of computing devices and/or provide targeted protection against malware and/or malicious users. As such, the provided techniques may protect computing devices by beneficially reducing security risks posed by malicious processes, malicious users, and/or compromised endpoint computing devices. In some embodiments, the provided techniques may advantageously protect cloud computing devices from malware attempting to infect cloud computing devices.

Figure 5:
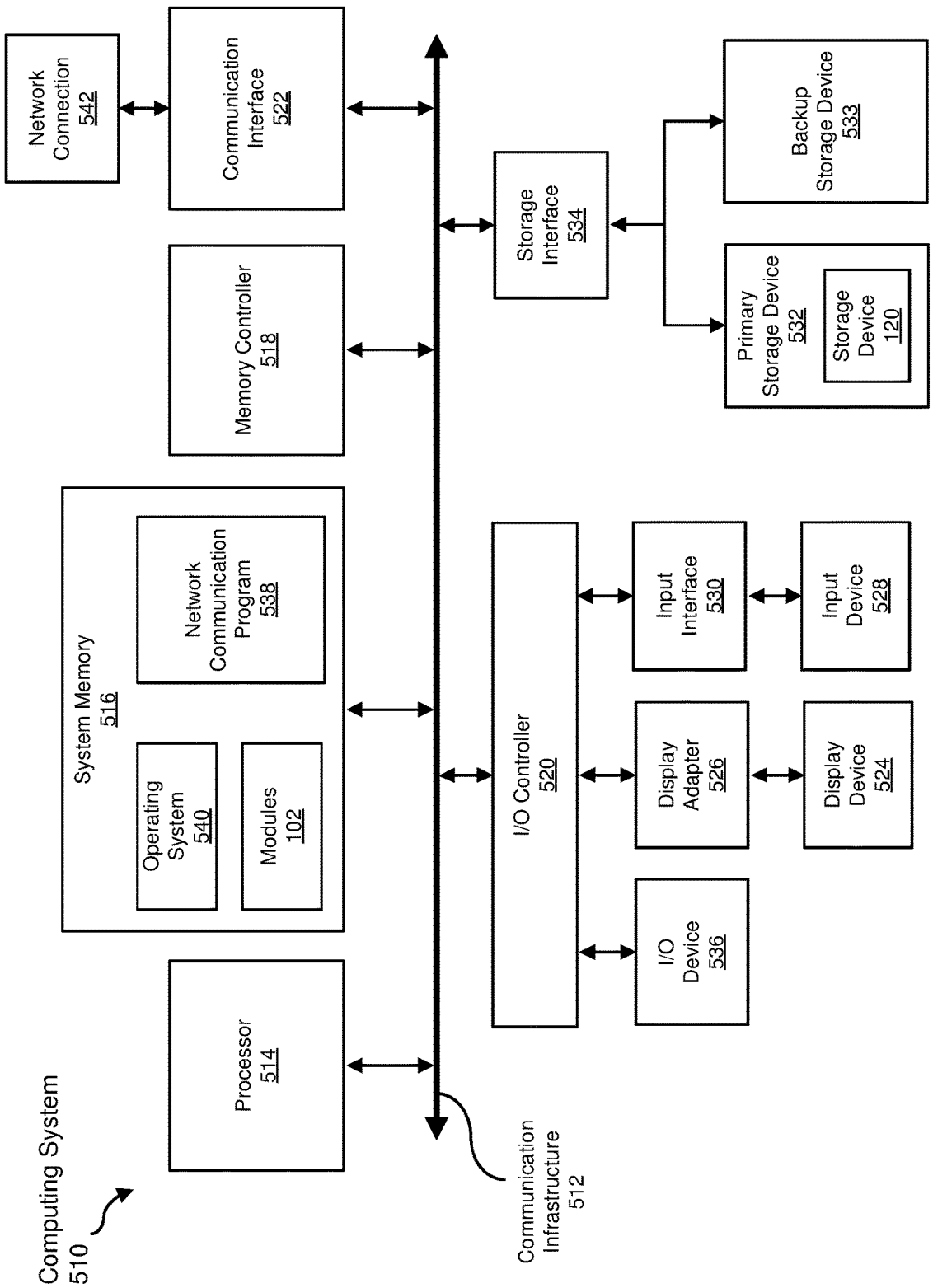
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, storage device 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
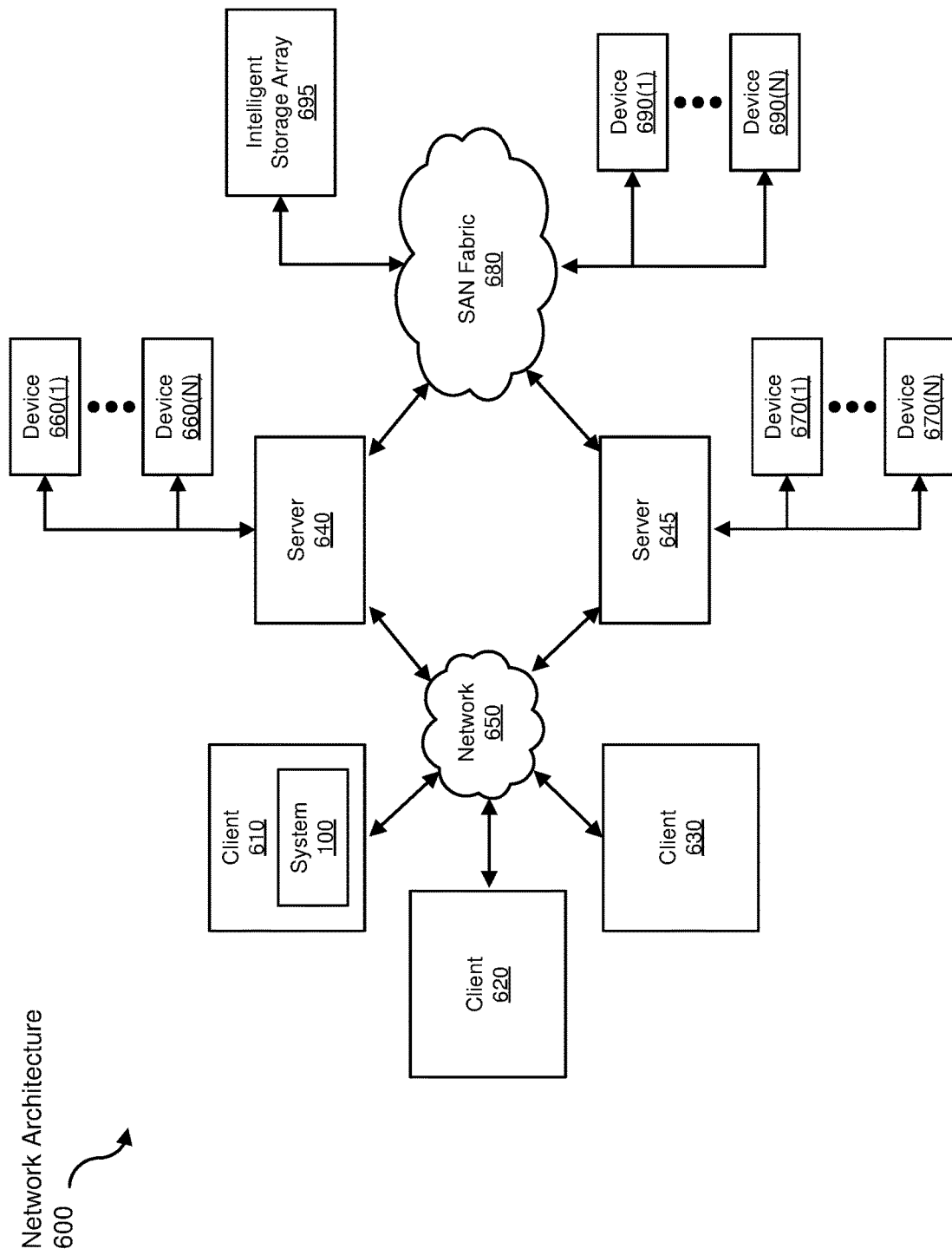
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for protecting a cloud computing device from malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive information to be transformed, transform the information, output a result of the transformation to a display device, use the result of the transformation to perform a security action, and store the result of the transformation to a storage device of a computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure. In some examples, the singular portends the plural, where practical.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." In some examples, the singular may portend the plural, when practicable. Finally, for ease of use, the terms "including" and "having" (and their derivatives), as used in the specification and claims, are interchangeable with and have the same meaning as the word "comprising."

What is claimed is:

1. A computer-implemented method for protecting a cloud computing device from malware, at least a portion of the method being performed by a computing device comprising at least one processor, the method comprising:
   intercepting, at the computing device and using a file filter driver, a malicious attempt by the malware to:
   access sensitive information in an encrypted file stored on the computing device; and
   send the sensitive information to the cloud computing device; and
   performing, at the computing device and responsive to the attempt to access the encrypted file, a first security action comprising:
   performing multifactor authentication responsive to the attempt to access the encrypted file;
   performing file integrity monitoring on the encrypted file to identify a change to credentials required to access the encrypted file;
   maintaining the encrypted file as encrypted in response to less than two authentication factors being validated;
   determining a time at which the attempt to access the encrypted file occurs;
   performing user and entity behavior analytics to identify an abnormal file access pattern; and
   performing a second security action when at least one of:
   the multifactor authentication fails:
   the file integrity monitoring identifies an unauthorized change to the credentials required to access the encrypted file;
   the attempt to access the encrypted file occurs outside of a predetermined schedule;
   or user and entity behavior analytics identifies the abnormal file, access pattern, wherein the second security action comprises: allowing access to the encrypted file based on a respective download rate.

2. The computer-implemented method of claim 1, wherein the sensitive information comprises a login credential.

3. The computer-implemented method of claim 2, wherein the login credential comprises at least one of a secure shell key, a password, and a token.

4. The computer-implemented method of claim 1, wherein the sensitive information comprises a privacy-enhanced mail file.

5. The computer-implemented method of claim 1, wherein the sensitive information comprises a financial account number.

6. The computer-implemented method of claim 5, wherein the financial account number comprises at least one of a credit card number and a bank account number.

7. The computer-implemented method of claim 1, further comprising logging the attempt to access the encrypted file.

8. The computer-implemented method of claim 1, wherein performing multifactor authentication comprises authenticating at least two of a password, a personal identification number, a smart card, a token, biometric information, and challenge response information.

9. The computer-implemented method of claim 1, further comprising saving the encrypted file on a storage device of the computing device when the file integrity monitoring indicates the encrypted file is changed relative to a prior version of the encrypted file.

10. The computer-implemented method of claim 1, wherein the second security action comprises at least one of:
   further encrypting the encrypted file;
   denying access to the encrypted file;
   blocking access to the encrypted file; and
   conditionally allowing access to the encrypted file.

11. The computer-implemented method of claim 10, wherein conditionally allowing access to the encrypted file comprises:
   allowing access to the encrypted file based on compliance of the computing device with a policy.

12. The computer-implemented method of claim 1, wherein the second security action comprises displaying, on a user display, an indication of an act performed as a part of the second security action.

13. A system for protecting a cloud computing device from malware, the system comprising:
   at least one physical processor; and
   physical memory comprising computer-executable instructions that, when executed by the physical processor, cause the physical processor to:
   intercept, at the system and using a file filter driver, a malicious attempt by the malware to:
   access sensitive information in an encrypted file stored on the system; and send the sensitive information to the cloud computing device; and
   perform, at the system and responsive to the attempt to access the encrypted file, a first security action comprising: performing multifactor authentication responsive to the attempt to access the encrypted file;
   performing file integrity monitoring on the encrypted file to identify a change to credentials required to access the encrypted file;
   maintaining the encrypted file as encrypted in response to less than two authentication factors being validated;
   determining a time at which the attempt to access the encrypted file occurs,
   performing user and entity behavior analytics to identify an abnormal file access pattern; and
   performing a second security action when at least one of the multifactor authentication fails;

the file integrity monitoring identifies an unauthorized change to the credentials required to access the encrypted file;

the attempt to access the encrypted file occurs outside of a predetermined schedule;

or user and entity behavior analytics identifies the abnormal file access pattern, wherein the second security action comprises: allowing access to the encrypted file based on a respective download rate.

14. The system of claim 13, wherein the performing multifactor authentication comprises authenticating at least two of a password, a personal identification number, a smart card, a token, biometric information, and challenge response information.

15. The system of claim 13, wherein the computer-executable instructions further comprise computer-executable instructions that, when executed by the physical processor, cause the physical processor to save the encrypted file on a storage device of the system when the file integrity monitoring indicates the encrypted file is changed relative to a prior version of the encrypted file.

16. The system of claim 13, wherein the second security action comprises at least one of:
    further encrypting the encrypted file;
    denying access to the encrypted file;
    blocking access to the encrypted file; and
    conditionally allowing access to the encrypted file.

17. A non-transitory computer-readable medium comprising one or more computer-executable instructions that, when executed by at least one processor of a computing device, cause the computing device to:
    intercept, at the computing device and usurp a file filter driver, a malicious attempt by the malware to:
    access sensitive information in an encrypted file stored on the computing device; and
    send the sensitive information to the cloud computing device; and perform, at the computing device and responsive to the attempt to access the encrypted file, a first security action comprising:
    performing multifactor authentication responsive to the attempt to access the encrypted file;
    performing file integrity monitoring on the encrypted file to identify a change to credentials required to access the encrypted file;
    maintaining the encrypted file as encrypted in response to less than two authentication factors being validated;
    determining a time at which the attempt to access the encrypted file occurs;
    performing user and entity behavior analytics to identify an abnormal file access pattern; and
    performing a second security action when at least one of:
    the multifactor authentication fails;
    the file integrity monitoring identifies an unauthorized change to the credentials required to access the encrypted file;
    the attempt to access the encrypted file occurs outside of a predetermined schedule;
    or user and
    entity behavior analytics identifies the abnormal file access pattern; wherein the second security action comprises: allowing access to the encrypted file based on a respective download rate.

18. The non-transitory computer-readable medium of claim 17, wherein the performing multifactor authentication comprises authenticating at least two of a password, a personal identification number, a smart card, a token, biometric information, and challenge response information.

19. The non-transitory computer-readable medium of claim 17, wherein the one or more computer-executable instructions further comprise one or more computer-executable instructions that, when executed by at least one processor of the computing device, cause the computing device to save the encrypted file on a storage device of the computing device when the file integrity monitoring indicates the encrypted file is changed relative to a prior version of the encrypted file.

20. The non-transitory computer-readable medium of claim 17, wherein the second security action comprises at least one of:
    further encrypting the encrypted file;
    denying access to the encrypted file;
    blocking access to the encrypted file; and
    conditionally allowing access to the encrypted file.

\* \* \* \* \*